United States Patent Office 3,373,231
Patented Mar. 12, 1968

3,373,231
MONOESTERS OF PHOSPHONIC ACIDS
Emile Cherbuliez and Joseph Rabinowitz, Geneva, Switzerland, assignors to Hooker Chemical Corporation, Niagara Falls, N.Y., a corporation of New York
No Drawing. Continuation-in-part of application Ser. No. 230,315, Oct. 11, 1962. This application Nov. 24, 1965, Ser. No. 509,646
8 Claims. (Cl. 260—956)

This is a continuation-in-part of United States patent application Ser. No. 230,315, filed Oct. 11, 1962, now U.S. Patent No. 3,268,629.

The present invention relates to new phosphonic monoesters and to an improved process for making phosphonic monoesters. According to the invention, an alcohol is reacted with an anhydride of a phosphonic acid to produce phosphonic monoesters of high purity in very good yields.

As anhydrides of phosphonic acids there are preferably used those commonly known as phosphonic oxides. These anhydrides can be prepared by known methods, as for example, by the action of the dichloride of a phosphonic acid according to the equation:

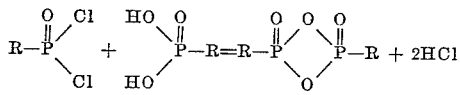

in which R represents an aliphatic, aromatic or heterocylic radical, usually of 1 to 18 carbon atoms, most often of 2 to 10 carbon atoms; these radicals may be substituted, as for example, with a nitro group or a halogen atom, such as fluorine. The radical R may more especially be represented by a monocyclic aryl radical, such as phenyl, halogeno-phenyl, e.g., p-fluoro-phenyl, p-chloro-phenyl, p-bromo-phenyl or nitro-phenyl, e.g., p-nitro-phenyl radical.

As a phosphonating agent, one may also use polyphosphonic acids, that is, the partial anhydrides of phosphonic acids, which give a lesser yield of ester, but which permit the recovery, in the form of alkaline earth metal phosphonate, of the phosphonic acid which did not react and which may thus be used for another charge. The polyphosphonic acids are considered to be phosphonic anhydrides.

The polyphosphonic acids are obtained by heating corresponding phosphonic acids at a temperature between about 120 to 200 degrees centigrade and under vacuum (about 3 to 30 millimeters of mercury) for a period of about 48 to 96 hours. The pyrophosphonic acids may also be prepared by the action of a given quantity of water on corresponding dichlorides.

It is sufficient to mix an equivalent of phosphonic oxide $(R-PO_2)_n$ with 0.5 to 3 moles, especially with 1.2 to 3 moles of anhydrous $R_1OH$ alcohol (excess alcohol) and to heat the mixture for a period of 3 to 48 hours at temperatures of between 20 and 200 degrees centigrade, preferably between 50 and 150 degrees centigrade, and the reaction may also be carried out under vacuum. The mixture becomes homogeneous and the phosphonic monoester is obtained, as exemplified by the following equation:

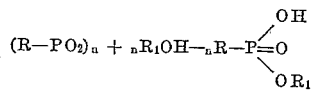

Generally, the phosphonic monoester is separated from the mixture in the form of its salt which may be characterized by the formula

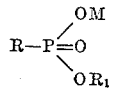

In the above formulas, R has the significance indicated previously, $R_1$ represents aliphatic radicals such as alkyl, alkenyl, alkynyl, cycloalkyl, cycloalkenyl, cycloalkynyl, or bicycloalkyl, araliphatic radicals such as aralkyl, aromatic radicals such as aryl, and heterocyclic radicals, M is a metal selected from the group consisting of alkali and alkaline earth metals, and $n$ is greater than one. These radicals, including those which contain double or triple bonds, remain intact during the reaction. The straight chain saturated aliphatic radicals usually are of 1 to 18 carbon atoms, preferably from 1 to 8 carbon atoms, the straight chain unsaturated aliphatic radicals usually are of 2 to 18 carbon atoms, preferably from 2 to 8 carbon atoms, while the cycloaliphatic radicals are from 3 to 18, preferably from 3 to 12. The radicals $R_1$ may also carry one or more compatible substituents such as halogen atoms, particularly chlorine or fluorine, free or esterified hydroxyl or carboxyl groups, carboxamide, nitrile or amino groups, preferably tertiary-substituted amino groups of nitrogen atoms, for example, aliphatic radicals such as methyl or ethyl groups or aromatic or araliphatic radicals such as a phenyl or benzyl radical. These substituents may be found in any compatible position of the indicated radicals with respect to the —OH to be phosphonated.

Thus, this reaction is a general one and applies to various alcohol types. If a polyol is treated by a phosphonic oxide, only one functional —OH is phosphonated, whatever the quantity of oxide is used. Among polyols are glycerol, glycol, pentaerythritol, neopentyl glycol, 1,4-(hydroxymethyl)benzene, sorbitol and trimethylol propane. With the halogenated alcohols, and particularly with the chlorinated and fluorinated alcohols, the reaction is carried out quite normally and the halogen is retained. With the amino alcohols this reaction proceeds quite well when the amino function is tertiary. Despite the fact that the pehnylphosphonic oxide has a tendency to react with primary and secondary amines to yield phosphonic amides, there are obtained phosphonic monoesters of amino alcohols with unreacted primary or secondary amino groups and only a minimal percentage of phosphonic amide. This amidized group may, if desired, be readily hydrolized in an acid medium when the ester portion is relatively stable. This phosphonation reaction is also readily accomplished and in good yield with unsaturated alcohols having double or triple bonds, singly or in multiple. The reaction is more rapid with primary than with secondary alcohols, thus, heating for a longer time will be desirable during phosphonation of a secondary alcohol.

A preferred embodiment of this invention is the reaction of an alcohol with an anhydride of a phosphonic acid in the presence of a tertiary base, such as tri-lower alkylamine, e.g., triethylamine or trimethylamine or a cyclic tertiary base, such as pyridine. The addition of an equivalent of the said tertiary base is especially advantageous if the radical $R_1$ is the radical of a tertiary aliphatic alcohol or the radical of an alcohol sensitive to acid, such as a terpene alcohol.

If the radical $R_1$ is the radical of an α-nitrilo alcohol, the nitrile group may be hydrolyzed to form an ester of an α-cerboxamido alcohol. If the reaction mixture does not contain any water, there may be intermediate formation of a cyclic derivative of the ester, which is easily hydrolyzed with water to form the monoester of the α-carboxamido alcohol. With β-, γ- and δ-nitrilo alcohols the monoesters of the nitrilo alcohols are preferably obtained; the hydrolysis to the carboxamido derivative does not take place.

The monoesters obtained can be isolated as their metal salts. The alkaline or alkaline earth metal salts of phosphoric monoesters are practically neutral in aqueous solution (pH about 6) and can be preserved indefinitely in aqueous solution (at this pH the time of half-hydrolysis in a 0.1 molar aqueous solution of ester at 100 degrees centigrade is greater than 500 hours); the salts of phosphonic monesters of amino alcohols are alkaline in aqueous solution (pH 10.5–11) and also are stable at this pH.

In order to isolate the alkaline earth metal or alkali metal salts of the phosphonic monoester, including the calcium, barium, strontium, sodium, potassium, lithium, aluminum and magnesium salts one proceeds as follows:

After cooling, the excess alcohol is distilled (when a large excess is used) under vacuum. The residue is taken up by water and neutralized by a hydroxide of an alkaline earth metal to a pH of 8.2 (turning of phenolphthalein). (In the case of amino alcohols, it is desirable to add hydroxide sufficient to obtain a pH of about 11.) The phosphonic acid which may still be present (formed by hydrolysis of the oxide which may not have reacted, or formed in the course of the reaction when polyphosphonic acid is used) precipitates partially as an alkaline earth metal salt; it is completely precipitated by the addition of one volume of alcohol. This is filtered and the filtrate which contains the alkaline earth metal salt of the phosphonic monoester is evaporated and dried under vacuum. Generally, the product obtained is pure. If not, it is purified by extraction with boiling acetone (which dissolves the impurities); after cooling, the alkaline earth metal salt of the phosphonic monester is filtered.

If it is desired to obtain alkali metal salts of these monoesters, the alkaline earth metal salt is dissolved in water and there is added the required quantity of carbonate of an alkali metal. The precipitate of the alkaline earth metal carbonate formed is filtered off and the filtrate is evaporated to dryness under vacuum. The amorphous residue treated by acetone is transformed into a crystalline precipitate which is the alkali metal salt of the monester. One may adapt the above methods to make other salts.

The alkaline earth metal salts of the phosphonic monoesters of superior aliphatic alcohols or the terpene alcohols are generally insoluble in water or in 50 percent ethyl alcohol. In order to isolate these monoesters, one proceeds preferably as follows:

(a) After cooling, the reaction mass is taken up by ether and neutralized by triethylamine. The triethylammonium salt of the phosphonic acid is filtered off, whereas the triethylammonium salt of the phosphonic monoester is soluble. The ether and the excess of the tertiary base are distilled, the residue is taken up by ether and the alkali earth metal salt of the phosphonic monoester is precipitated by adding an aqueous solution of the corresponding alkali earth metal halogenide. The precipitate is washed with water and is purified as previously described.

(b) If the reaction is carried out in the presence of a tertiary base such as trimethylamine, triethylamine or pyridine, the reaction mixture is taken up by ether and the phosphonate of the tertiary amine is filtered off. The ether and the excess of the tertiary base are distilled and the residue is taken up by water. The alkaline earth metal salt of the phosphonic monoester is precipitated by adding an aqueous solution of an alkali earth metal halogenide.

If the free phosphonic monoester crystallizes easily, the reaction mixture is taken up by water and the free phosphonic monoester is precipitated by adding a strong acid, such as hydrochloric acid (this is the case, for instance, of menthyl phenylphosphonic acid).

This new process of phosphonation of alcohols by phosphonic oxides and polyphosphonic acids has a number of advantages: it leads straight to monoesters only, it is simple and directly gives pure products in very high yield, calculated as a percentage of the theoretical value. Moreover, the process is quite general and many of the prepared phosphonic monoesters are new.

The monoesters thus obtained and their salts may be used as additives to liquid fuels, such as gasoline, or as products for impregnating fibers so as to make them fireproof, pest-resistant or vermin-proof.

The invention is illustrated but not limited by the following examples. All parts are by weight and all temperatures are in degrees centigrade, unless otherwise indicated.

*Example 1*

140 parts (1 equivalent) of phenylphosphonic oxide $(C_6H_5-PO_2)_n$ and 48 to 64 parts (1.5 to 2 moles) of anhydrous methanol are heated to 100 degrees centigrade (bath temperature). After cooling, the excess alcohol is evaporated under vacuum and the residue is taken up with 500 to 800 parts of $H_2O$. This solution is neutralized by $Ca(OH)_2$ (or $Ba(OH)_2$ if one desires to obtain a barium salt of the monoester) up to a pH at which phenolphthalein turns to colored form (about 8.2). Then an equal volume of alcohol is added and the calcium (or barium) phenylphosphonate thus precipitated is filtered. The filtrate, evaporated to dryness, yields the monomethylphenylphosphonate of calcium (or barium) which is generally pure initially. If it is not, the dry residue is dissolved in boiling acetone and, after cooling, the calcium or barium monomethylphenylphosphonate is filtered. The yield in pure product,

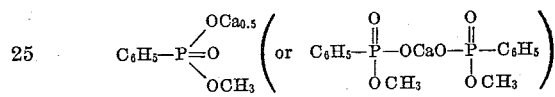

is 77 percent of theoretical.

Instead of phenylphosphonic oxide, other aryl phosphonic oxides may be employed to obtain corresponding salts of aryl phosphonic monoesters.

*Example 2*

The phenylphosphonic monoesters (in the form of their calcium or barium salts) of the alcohols mentioned below have been prepared in the same manner as described in Example 1.

The monoester of ethanol of the formula:

Yield=84 percent.

The monoester of propanol of the formula:

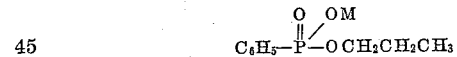

Yield=90 percent.

The monoester of isopropanol of the formula:

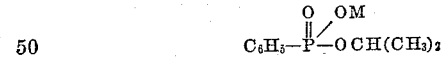

Yield=56 percent.

The monoester of butanol of the formula:

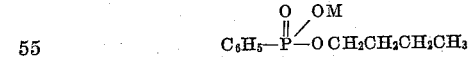

Yield=75 percent.

The monoester of isobutanol of the formula:

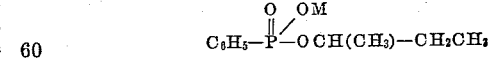

Yield=60 percent.

The monoester of amyl alcohol of the formula:

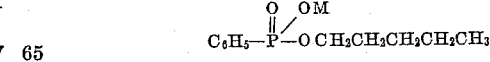

Yield=71 percent.

In all the above formulas M is $Ca_{0.5}$ or $Ba_{0.5}$.

*Example 3*

The esters described in Examples 1 and 2 were also obtained with the aid of polyphenylphosphonic acid (n—2) as the phosphonating agent, in the following manner:

In a flask connected to a water-jet pump and immersed in an oil bath, 140 parts (1 mole) of phenylphosphonic acid are heated gradually to 200 degrees centigrade (bath temperature) and are kept for about 48 hours to 72 hours at that temperature and under vacuum. This treatment produces a polyphenylphosphonic acid with a degree of condensation of about 2, which can be verified by the loss of weight of the flask or by acidimetric titration (the titratable acidity between the respective colorings of methyl orange and phenolphthalein greatly diminishes). After cooling, 1.5 to 2.0 moles of alcohol are introduced into the flask, with the operation being continued in the manner described in Example 1. There is obtained a phenylphosphonic monoester in the form of its barium or calcium salt, described under Examples 1 and 2, with yields of 51 percent for the methyl monoester, 44 percent for the ethyl monoester, 3 percent for the propyl monoester, 22 percent for the isopropyl monoester, 40 percent for the butyl monoester, 27 percent for the isobutyl ester and 22 percent for the amyl ester. These yields are clearly below those obtained with the oxides (Examples 1 and 2) but as in the Examples 1 and 2, one may recover all the phenylphosphonic acid which is not transformed into an ester, in the for of an alkaline earth metal salt.

*Example 4*

140 parts (1 equivalent) of phenylphosphonic oxide and 84 to 112 parts (1.5 to 2.0 moles) of propargyl alcohol are heated at 90 degrees centigrade. One then isolates the monopropargylphenylphosphonate of barium or calcium in the manner already described in Example 1. It is illustrated by the structural formula:

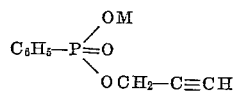

and the yield is 70 percent.

By infrared spectroscopic examination, the presence of the —C≡C— group is verified.

In the same manner, there is prepared in 90 percent yield, phenylphosphonic monoester of allyl alcohol.

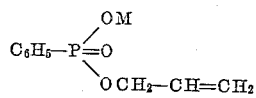

All of these are new products.
In the above formulas M=Ca$_{0.5}$ or Ba$_{0.5}$.

*Example 5*

140 parts (1 equivalent) of phenylphosphonic oxide and 120 to 161 parts (1.5 to 2.0 moles) of 2-chloroethanol are heated for 16 hours at 120 degrees centigrade (bath temperature). After cooling, the excess of chlorohydrin is distilled off under vacuum and one isolates the varium salt of the mono(2-chloroethyl)phenylphosphonic acid,

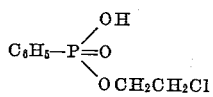

in a yield of 85 percent.

In a similar manner, except for the temperature and duration of heating (which are shown in parenthesis), the phosphonic monoesters of halogenated alcohols mentioned below are obtained, with yields indicated.

Phenylphosphonic monoester of 3-chlorophopanol-1 (100 degrees centigrade, 16 hours) of the formula:

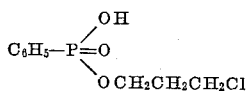

Yield=84 percent.

Phenylphosphonic monoester of 4-chlorobutanol-1 (50 degrees centigrade, 16 hours) of the formula:

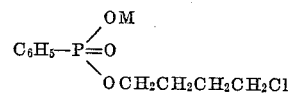

Yield=65 percent.

Phenylphosphonic monoester of 1,3-difluoropropanol-2 (130 degrees centigrade, 48 hours) of the formula:

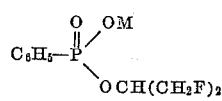

Yield=56 percent.

Phenylphosphonic monoester of 3-fluoropropanol-1 (100 degrees centigrade, 48 hours) of the formula:

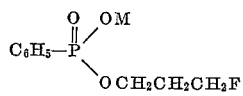

yield=40 percent.

Phenylyphosphonic monoester of 2,2,3,3-tetrafluoropropanol-1 (100 degrees centigrade, 48 hours) of the formula:

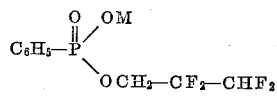

yield=60 percent.

All of these are new products.
In the above formulas M=Ca$_{0.5}$ or Ba$_{0.5}$.

*Example 6*

140 parts (1 equivalent) of phenylphosphonic oxide (C$_6$H$_5$—PO$_2$)$_n$ and 91 to 124 parts (1.5 to 2.0 moles) of glycol are heated 48 hours at 100 degrees centigrade (bath temperature). There is isolated the calcium or barium salt of the (2-hydroxyethyl-1)phenylphosphonic acid,

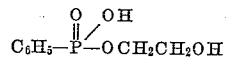

in the manner described in Example 1, with a yield of 60 percent.

In a similar manner, except as it relates to the temperature for the tetramethyleneglycol, there are prepared the alkaline earth metal salts of phenylphosphonic monoesters of diols mentioned below with the yields indicated:

Phenylphosphonic monoester of propanediol-1,3 of the formula:

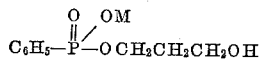

yield=65 percent.

The phenylphosphonic monoester of butanediol-1,4 (here the reaction takes place at 50 degrees centigrade, for 48 hours) of the formula:

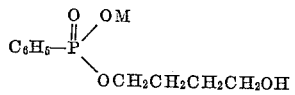

yield=72 percent.

Phenylphosphonic monoester of pentanediol-1,5 of the formula:

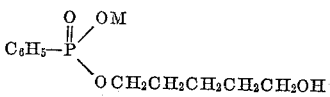

yield=77 percent.

In the case of butanediol-1,4 (tetramethyleneglycol), the temperature should not exceed 60 degrees centigrade, in order to avoid the formation of tetrahydrofurane in the phosphonation process.

Also, even if there is used a large excess of a phosphonating agent, only one group —OH is phosphonated.

All of these esters are new.

In the formulas given M=Ca$_{0.5}$ or Ba$_{0.5}$.

Example 7

140 parts (1 equivalent) of phenylphosphonic oxide and 267 to 336 parts (3 to 4 moles) of dimethylcolamine (dimethylaminoethanol) are heated for 3 hours at 120 degrees centigrade. The excess of dimethylcolamine is distilled off under vacuum and the residue is dissolved in 800 to 1000 parts of water. There is then added an excess of calcium hydroxide in suspension in water with the mixture being agitated for several minutes. After filtering, one volume of alcohol is added to the filtrate to completely precipitate the calcium phenylphosphonate still present. This is followed by further filtration and evaporation under vacuum. An amorphous residue is obtained, which, after being treated with boiling acetone, cooled and filtered, yields a precipitate of calcium dimethylaminoethylphenylphosphonate. The formula of this compound is

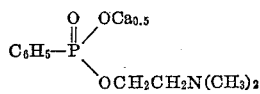

and it was obtained in 50 percent yield.

In treating 1-diethylaminopropanol-2 in the above described manner, there is obtained by evaporation under vacuum an aqueous alcoholic solution of calcium (1-diethylaminopropyl-2)phenylphosphonate,

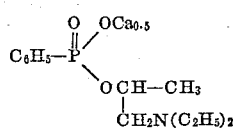

which is pure. The yield is 30 percent.

Example 8

140 parts (1 equivalent) of phenylphosphonic oxide and 152.5 (2.5 moles) of colamine are heated at 180 degrees centigrade (bath temperature) up to the point where the mass becomes homogenous. Then a vacuum is created in the flask, which is kept at this temperature overnight. After cooling, the reactive mass is dissolved in 800 to 1000 parts of water with the addition of an excess of calcium hydroxide. This mixture is agitated and an equal volume of ethanol is added. The liquid is filtered and evaporated dry under vacuum. The residue is treated with boiling alcohol and yields, after cooling, a precipitate of calcium (2-aminoethyl)phenylphosphonate,

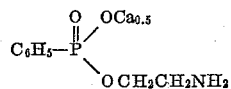

in 40 percent yield.

Example 9

140 parts (1 equivalent) of phenylphosphonic oxide, 79 parts (1 mole) of pyridine and 111 to 148 parts (1.5 to 2.0 moles) of tertiary butanol are heated for one night at 75 degrees centigrade (bath temperature). A calcium or barium salt of t-butylphosphonic acid,

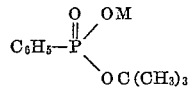

is obtained in a yield of 60 percent by isolation in the manner described under Example 1.

Example 10

One mole of cetylic alcohol and one equivalent of phenylphosphonic oxide are heated for 48 hours at 110 degrees centigrade. After cooling, the reaction mixture is taken up by ether and four equivalents of triethylamine are added. The precipitate of triethylammonium phenylphosphonate is filtered off, whereas the triethylammonium salt of the monoester is soluble. The ether and excess of triethylamine are evaporated under reduced pressure and the residue is taken up by ether. This solution, treated with aqueous barium chloride, yields a gelatinous precipitate which is filtered off, washed with water and then with acetone and ether, and finally dried in vacuum over P$_2$O$_5$. The yield is 50 percent of pure barium cetyl phenylphosphonate:

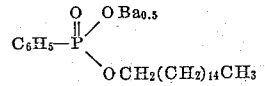

When cetyl alcohol, used as starting material in the above example, is replaced by one of the alcohols of the following formulas: CH$_3$(CH$_2$)$_6$CH$_2$OH,

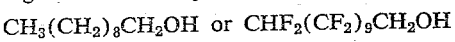

and when using the described procedure, the following barium phenylphosphonic monoesters are obtained:

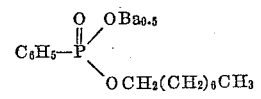

Yield=55 percent.

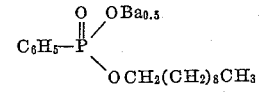

Yield=23 percent.

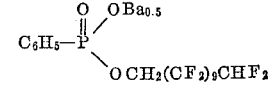

Yield=55 percent.

Example 11

One mole of nerol, two moles of triethylamine and one equivalent of phenylphosphonic oxide are mixed carefully (the reaction is exothermic and it is necessary to cool). After a few minutes the mixture becomes homogeneous. It is then heated at 100 degrees centigrade for 15 hours (with good agitation). After cooling, the reaction mass is taken up by anhydrous ether. The triethylammonium phenylphosphonate is filtered off and the ether and the excess of triethylamine are evaporated under reduced pressure. The oily residue is dissolved in water and the pH brought to about 5, by adding dilute hydrochloric acid. When an excess of a concentrated aqueous solution of calcium chloride is added to the preceding solution, voluminous precipitate of the calcium salt of the phenylphosphonic monoester appears. This precipitate, which retains most of the unreacted terpene alcohol, is washed with water and then with acetone which dissolves most of the retained alcohol. To achieve the elimination of the retained alcohol, the precipitate is finally washed with ether and then dried in vacuo over P$_2$O$_5$. The yield is 30 percent of pure calcium neryl phenylphosphonate C$_{16}$H$_{22}$O$_3$PCa$_{0.5}$.

In a similar manner, the calcium salts of the phenylphosphonic monoesters of geraniol and farnesol are obtained in 31 percent yield each.

Example 12

Three moles of menthol, 3 moles of pyridine and 3 equivalents of phenylphosphonic oxide are mixed very carefully until the mass liquefies and becomes homogeneous. The mixture is then heated for 15 hours at 70–75 degrees centigrade. After cooling, the reaction mixture is taken up by water. This solution is introduced slowly and with agitation in normal hydrochloric acid (3 liters). The precipitate of methylphenylphosphonic acid is filtered off, washed with water and then heated at 60 degrees centigrade, in vacuo, for one night, in order to eliminate any trace of menthol which has been retained by the precipitate. In this manner, pure menthyl phenylphosphonic acid, $C_{16}H_{25}O_3P$, melting point 91 degrees centigrade, is obtained in an 81 percent yield.

In a similar manner, bornyl phenylphosphonic acid, $C_{16}H_{23}O_3P$, melting point 104–105 degrees centigrade, is prepared from borneol in an 88 percent yield.

Example 13

One mole of lactonitrile and one equivalent of phenylphosphonic oxide are heated at 90 degrees centigrade for 46 hours. After cooling, the reaction mass is taken up by cold water and is quickly neutralized by barium hydroxide to a pH of 8.2 (turning of phenolphthalein). One volume of cold alcohol is then added to complete the precipitation of the barium phenylphosphonate which is filtered off and discarded. The filtrate is evaporated and the residue is treated with acetone, filtered and dried. The dry residue is treated again several times with acetone in order to eliminate completely any trace of lactonitrile that would be still present, and dried in vacuo. The yield of pure barium 2-carbamido-2-ethyl phenylphosphonate is 89 percent.

The α-nitrilo alcohols are transformed, under the described conditions, into the corresponding carboxamidoalkyl phenylphosphonic monoesters, β-, γ- and δ-ntrilo alcohols yield the corresponding nitriloalkyl phenylphosphonic monoesters.

In a similar manner are phosphonated the nitrilo alcohols of the following formulas (yield of the barium salt of the monoester in parenthesis): $NC-CH_2OH$ (35 percent); $NC-C(CH_3)_2OH$ (64 percent);

$NC-CH_2CH_2OH$ (70 percent); $NC-CH(CH_3)-CH_2OH$ (34 percent); $NC-CH_2CH_2CH_2OH$ (58 percent);

$NC-(CH_2)_3-CH_2OH$ (59 percent). The first two nitrilo alcohols yield the corresponding carboxamidoalkyl phenylphosphonic monoesters and the other nitrilo alcohols (β-, γ- and δ-nitrilo alcohols) yield the corresponding nitriloalkyl phenylphosphonic monoesters.

Example 14

One mole of anhydrous glycerol and one mole of phenylphosphonic oxide are heated at 165 degrees centigrade until the mass liquefies, and then for 20 hours at 120 degrees centigrade. The reaction mass treated in the manner described in Example 1, yields crude barium glyceryl phenylphosphonate. The crude salt is reduced to a very fine powder which is heated for a few minutes with absolute alcohol. After cooling, one volume of acetone is added and the precipitate filtered off, washed with alcohol and vacuum dried. These operations are repeated on this product until pure barium glyceryl phenylphosphonate is obtained. The yield is 49 percent.

$HOCH_2-CHOH-CH_2OP(O)(C_6H_5)(OBa_{0.5})$:
    barium α-glyceryl phenylphosphonate $HOCH_2-CH[OP(O)(C_6H_5)(OBa_{0.5})]$
    $-CH_2OH$: barium β-glyceryl phenylphosphonate The determination of the neighboring —OH groups by the method of Malaprade indicates that the product is composed of 51.5 percent of barium α-glyceryl phenylphosphonate and of 48.5 percent of the β-derivative.

Example 15

Six moles of tribromoethanol and 4 equivalents of phenylphosphonic oxide are heated at 90 degrees centigrade for 44 hours. After cooling, the reaction mass is taken up by cold alcohol or acetone and poured immediately into two liters of water. This mixture is neutralized with barium hydroxide to a pH of 8.2 and diluted with water to five liters. One volume of alcohol is added and the barium phenylphosphonate is filtered off. The filtrate is evaporated to dryness under vacuum, and the residue treated with ether (in order to dissolve any traces of retained tribromoethanol) yields the pure barium tribromomethyl phenylphosphonate having the following formula:

$$CBr_3-CH_2OP(O)(C_6H_5)(OBa_{0.5})$$

Yield: 70 percent.

In a similar manner are prepared the phenylphosphonic monoesters of trichloroethanol, trichloroisopropanol and trifluoroethanol:

$$CCl_3-CH_2OP(O)(C_6H_5)(OBa_{0.5})$$

Yield: 88 percent.

$$CCl_3-CH[OP(O)(C_6H_5)](OBa_{0.5})-CH_3$$

Yield: 78 percent.

$$CF_3-CH_2OP(O)(C_6H_5)(OBa_{0.5})$$

Yield: 81 percent.

Example 16

In a similar manner as described in Examples 1 to 15, p-fluorophenylphosphonic monoesters are obtained in good yields p-fluorophenylphosphonic oxide (a novel oxide) is reacted with the corresponding alcohol.

Using, for example, as starting alcohols: methanol, t-butanol, t-amyl alcohol, propane-1,3-diol, 2-chloro-1-ethanol, n-decanol, 2-amino-1-ethanol, 2-dimethylamino-1-ethanol, lactonitrile and 2-nitrilo-1-ethanol, the following p-fluorophenylphosphonic monoesters are obtained.

$R-P(O)(OM)(OCH_3)$ (70%)

$(CH_3)_3COP(O)(R)(OM)$ (53%)

$(C_2H_5)(CH_3)COP(O)(R)(OM)$ (16%)

$HOCH_2CH_2CH_2OP(O)(R)(OM)$ (70%)

$ClCH_2CH_2OP(O)(R)(OM)$ (62%)

$CH_3(CH_2)_8CH_2OP(O)(R)(OM)$ (62%)

$H_2NCH_2CH_2OP(O)(R)(OM)$ (53%)

$(CN_3)_2NCH_2CH_2OP(O)(R)(OM)$ (30%)

$H_2N-CO-CH(CH_3)OP(O)(R)(OM)$ (38%)

$NC-CH_2CH_2OP(O)(R)(OM)$ (64%)

R represents the p-fluorophenyl radical ($F-C_6H_4-$)
M represents an equivalent of an alkali earth metal and the yield is indicated in parentheses.

p-Fluorophenylphosphonic oxide reacts with all the other alcohols mentioned in Examples 1 to 15 to yield the corresponding p-fluorophenylphosphonic monoesters.

The p-fluorophenylphosphonic oxide is prepared as follows according to the equation:

$$F-C_6H_4-P(=O)(Cl)_2 + (HO)_2P(=O)-C_6H_4-F \rightarrow F-C_6H_4-P(O)(O)_2P(O)-C_6H_4-F + 2HCl$$

38 grams (0.216 mole) of p-fluorophenylphosphonic acid and 64 grams (0.3 mole) of p-fluorophenylphosphonyl dichloride are heated at 200 degrees centigrade for two hours (under light vacuum in order to facilitate the elimination of the hydrochloric gas evolved during the reaction). The excess of dichloride is distilled under reduced pressure. After cooling, the residue is heated with 400 milliliters of dry benzene until complete dissolution. This solution is left for two days at 5 degrees centigrade and the precipitate (p-fluorophenylphosphonic oxide) filtered off. The filtrate is left again for two days at 5 degrees centigrade and a second amount of p-fluorophenylphosphonic oxide is filtered off. The operation is repeated until no further precipitation occurs (after concentration of the solution to 200 milliliters). The precipitates are washed with benzene and dried in vacuo at 60 degrees centigrade. In this manner, 60 grams of pure p-fluorophenylphosphonic oxide, melting point 109–111 degrees centigrade, are obtained (yield 88 percent).

$(C_6H_4O_2FP)_2$—Calculated: F, 12.0 percent; P, 19.6 percent; equivalent weight, 158.1. Found: F, 12.4 percent; P, 19.3 percent; equivalent weight, 160.

What is claimed is:

1. A compound selected from the group consisting of compounds represented by the formulas

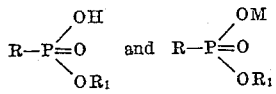

wherein R is selected from the group consisting of phenyl, halogeno-phenyl and nitro-phenyl, $R_1$ is alkenyl of 2 to 18 carbon atoms, and M is selected from the group consisting of alkali metals and alkaline earth metals.

2. A compound in accordance with claim 1 of the formula

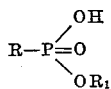

wherein R and $R_1$ are each as defined in claim 1.

3. A compound in accordance with claim 1 of the formula

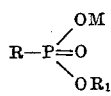

wherein R and $R_1$ are each as defined in claim 1.

4. A compound in accordance with claim 2 wherein $R_1$ is 2 to 8 carbon atoms and wherein R is selected from the group consisting of phenyl and p-fluorophenyl.

5. A compound in accordance with claim 3 wherein R is selected from the group consisting of phenyl and p-fluorophenyl.

6. The compound of the formula:

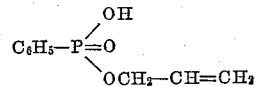

7. The compound of the formula:

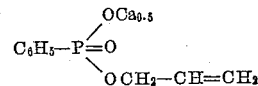

8. The compound of the formula:

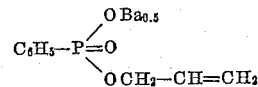

References Cited

UNITED STATES PATENTS 2,792,374   5/1957   Bradley et al. _____ 260—916 X

CHARLES B. PARKER, *Primary Examiner.*

R. L. RAYMOND, *Assistant Examiner.*

UNITED STATES PATENT OFFICE
CERTIFICATE OF CORRECTION

Patent No. 3,373,231                                    March 12, 1968

Emile Cherbuliez et al.

It is certified that error appears in the above identified patent and that said Letters Patent are hereby corrected as shown below:

Column 2, line 28, after "Among" insert -- the --; line 36, "pehnylphosphonic" should read -- phenylphosphonic --; line 61, "α-cerboxamido" should read -- α-carboxamido --. Column 4, line 34, "phenylphsphonic" should read -- phenylphosphonic --. Column 5, line 15, "3" should read -- 33 --; line 22, "for" should read -- form --; line 55, "varium" should read -- barium --; line 67, "3-chlorophopanol-1" should read -- 3-chloropropanol-1 --. Column 9, line 27, "ntrilo" should read -- nitrilo --.

Signed and sealed this 10th day of March 1970.

(SEAL)

Attest:

Edward M. Fletcher, Jr.                            WILLIAM E. SCHUYLER, JR.
Attesting Officer                                          Commissioner of Patents